United States Patent [19]

Sims

[11] 4,384,820
[45] May 24, 1983

[54] ROTARY PUMP ASSEMBLY CONTAINER

[76] Inventor: James O. Sims, Rte. 2, Box 248, Hartselle, Ala. 35640

[21] Appl. No.: 302,643

[22] Filed: Sep. 15, 1981

Related U.S. Application Data

[62] Division of Ser. No. 945,558, Sep. 25, 1978, Pat. No. 4,289,445.

[51] Int. Cl.³ .............................................. F01D 11/00
[52] U.S. Cl. ................................ 415/113; 415/170 A
[58] Field of Search .................. 415/113, 170 A, 174, 415/173 R, 111

[56] References Cited

U.S. PATENT DOCUMENTS

| | | | |
|---|---|---|---|
| 2,427,656 | 9/1947 | Blom | 415/176 |
| 3,954,348 | 5/1976 | Renaud | 415/113 |
| 4,289,445 | 9/1981 | Sims | 415/113 |

Primary Examiner—Everette A. Powell, Jr.
Attorney, Agent, or Firm—C. A. Phillips

[57] ABSTRACT

A pump assembly wherein fluid under pressure in a pump housing is prevented from escaping around the drive shaft of the pump by a seal which is held in place by the combination of a spring and fluid pressure applied through a diaphragm from the interior of the pump housing.

3 Claims, 9 Drawing Figures

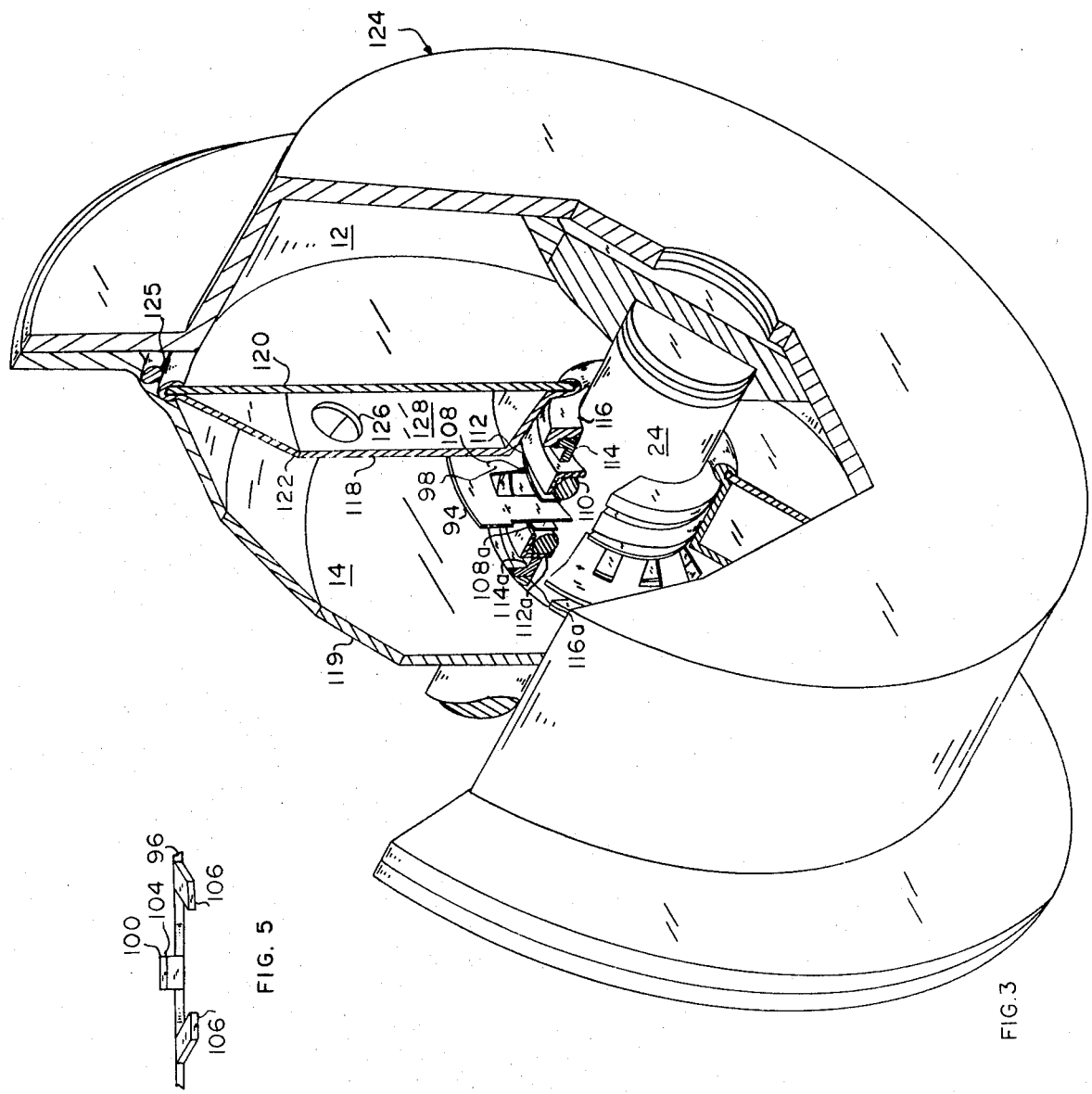
FIG. 3
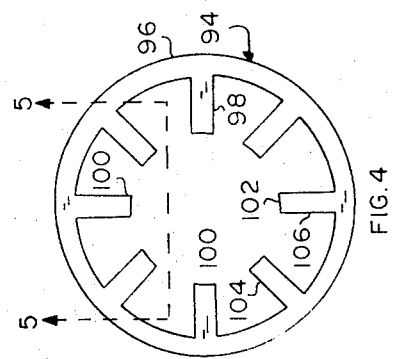
FIG. 5
FIG. 4
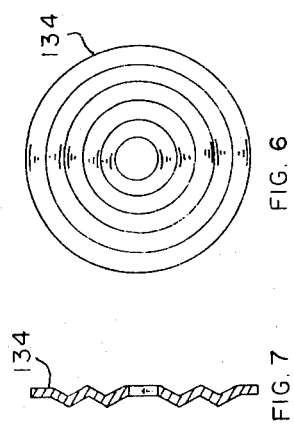
FIG. 6
FIG. 7

ROTARY PUMP ASSEMBLY CONTAINER

This is a division of application Ser. No. 945,558 filed Sept. 25, 1978, now U.S. Pat. No. 4,289,445.

BACKGROUND OF THE INVENTION

1. Field of the Invention

This invention relates to pumps, and particularly to pumps wherein fluid pressures must be sealed from escape around pump drive shafts, such as with rotary pumps of the centrifugal type.

2. General Description of the Prior Art

A principal cause of failure with centrifugal pumps is seal failure, that is, leakage by deterioration or destruction of shaft seals between the outside and inside of a pump housing. Shaft seals typically employ two frictionally engaging seal members, one of which is held stationary and seals to the pump housing, and the other sealably engages the pump shaft and rotates with and seals to it. In order to perfect the seal, some form of force must be applied to urge one of the sealing members against the other while they relatively rotate. Generally, if not in all cases, the shaft seal member is spring biased against the stationary sealing member. A spring force being a relatively constant force must be selected to provide sufficient force to effect a seal with maximum pump fluid pressures present, and, as a result, it is typical to provide a rather substantial spring force. This in turn, of course, effects a substantial friction between the sealing members, and if the pump is accidentally run dry, then one or both of the sealing members will most likely be damaged.

It is an object of this invention to provide an improved pump seal assembly wherein a variable bias is applied to sealing members, and thereby their life substantially extended.

SUMMARY OF THE INVENTION

In accordance with this invention, an auxiliary chamber, a seal chamber, is constructed around the shaft exit of a pump and at least partially filled with a lubricating fluid. In addition to providing a coil spring or other form of mechanical bias between stationary and rotating sealing members, fluid pressure from the pump is coupled through a pressure transmissive diaphragm to the lubricating fluid of the seal chamber. In this manner, the seal chamber is pressurized to essentially the same pressure as the pump, and this pressure is employed to supplement the force of the spring, which then may provide substantially less force. Thus, by this arrangement, with full pumping pressure present, full maximum seal pressure would be exerted between the sealing members; but when pump pressure is reduced, or where there is zero pump pressure, the force on the seals is substantially reduced, and thereby a significant reduction in friction between the sealing members.

BRIEF DESCRIPTION OF THE DRAWINGS

FIG. 3 is a pictorial view of another alternate embodiment of the invention.

FIG. 4 is an axial view of a seal biasing spring employed by the embodiment of the invention shown in FIG. 3.

FIG. 5 is a peripheral view of the spring shown in FIG. 4.

FIG. 6 is an axial view of an alternate form of a diaphragm for the embodiment of the invention shown in FIG. 3.

FIG. 7 is a sectional view along lines 6—6 of FIG. 6.

DETAILED DESCRIPTION OF THE DRAWINGS

Figure 1:
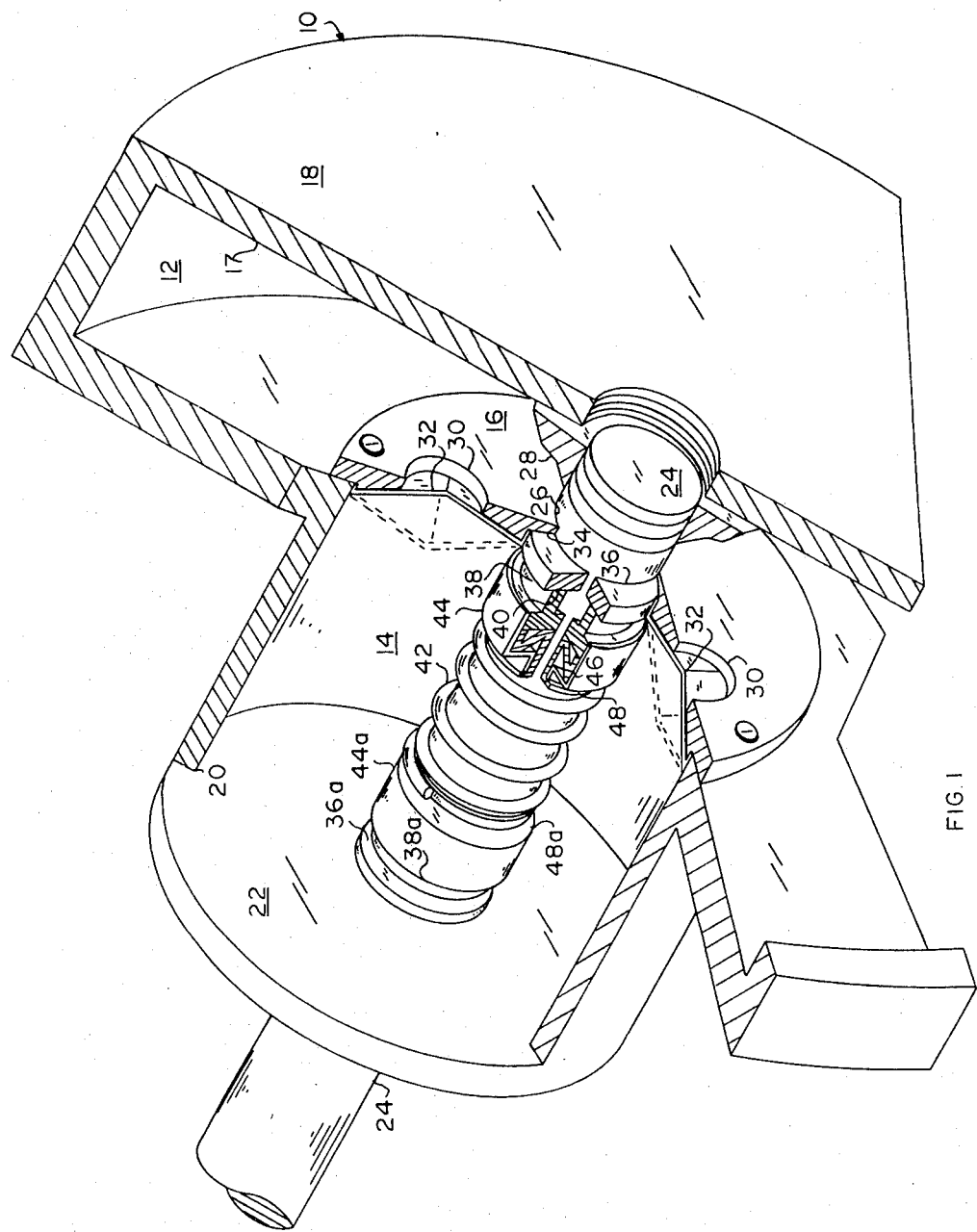
FIG. 1 is a pictorial view, partially in section and partially cut away, of an embodiment of the invention.

Referring to FIG. 1, pump housing 10 is configured to provide a cylindrical impeller chamber 12 and an adjoining, smaller, cylindrical seal chamber 14, the chambers being separated by a common wall or plate 16. The opposite end 17 of impeller chamber 12 is closed by wall 18, and opposite end 20 of seal chamber 14 is closed by end plate 22. Pump drive shaft 24 powered by means not shown, extends from the outside of pump housing 10 through end 20 of the pump housing and passes through seal chamber 14 into impeller chamber 12 through opening 26 where it is attached to and thereby rotates conventional impeller 28. Actual physical support for shaft 24 is provided by bearings (not shown) mounted on the outer side of wall 22. Plate 16 generally separates chambers 12 and 14 but includes openings 30 which permit fluid under pump pressure from impeller chamber 12 to pass through and engage diaphragm 32.

Opening 26 of plate 16 includes about its circumference an L-shaped recess 34 facing the interior of seal chamber 14. Seal 36, typically formed of carbide, ceramic, or other sealing material, is held stationary in L-shaped recess 34, and thus provides a seal between seal 36 and plate 16. Finally, the seal between chambers 12 and 14 is effected by annular T-shaped seal 38 which is frictionally held by and rotates with shaft 24, it having a face region 40 which makes a sealing engagement with seal 36 as seal 38 rotates with respect to seal 36. Seal 38 is biased to the right by spring 42 acting through spring retainer 44 and resilient retainer core 46.

A like sealing arrangement with like components (designated with the suffix "a") is employed to seal around shaft 24 where it passes through end plate 22 between the interior of seal chamber 14 and the exterior of pump housing 10. Thus, spring 42 applies a force to the left through spring retainer 44a and a retainer core (not shown) to T-shaped seal 38a, and the latter is thus urged into sealing engagement with seal 36a. Seal chamber 14 is filled with a lubricating liquid.

As discussed above, it has been a common practice to provide a bias force on a shaft seal for rotary pumps solely by means of a spring force on a rotating sealing member, which then applies a frictional force to a stationary seal member with which it is associated. In such case, this force must be such as to exceed the maximum pressure that may be anticipated as a counterforce from pressure in an impeller chamber on the stationary seal. Accordingly, the spring must be adapted to apply a rather substantial force. Aa indicated above, this is often the weak link in pump lift and may be the determining factor in how long a pump will run without leaking. In contrast, and in accordance with this invention, the spring force is materially reduced by providing a supplemental variable baising pressure which rises as needed. This is achieved by a force in an axial direction applied to seals 38 and 38a on faces 48 and 48a of retainers 44 and 44a, respectively. This fluid pressure is effected by lubricating fluid pressurized by engagement with diaphragm 32.

As pressure in impeller chamber 12 increases, diaphragm 32 is forced to the left in seal chamber 14, and thus there is applied an essentially equal pressure to the lubricating oil within seal chamber 14. As a result, increased force (in addition to that applied by spring 42) is applied to side faces 48 and 48a of engagement retainers 44 and 44a, which increased force is also applied to seals 38 and 38a. Thus, with only a minimum biasing force provided by spring 42, which would prevent leakage during periods when there is little pump pressure in chamber 12, increases in pressure are only effected as needed, and thus there is no greater frictional force between the sealing surfaces than necessary to offset the actual pressure build-up in chamber 12.

Figure 2:
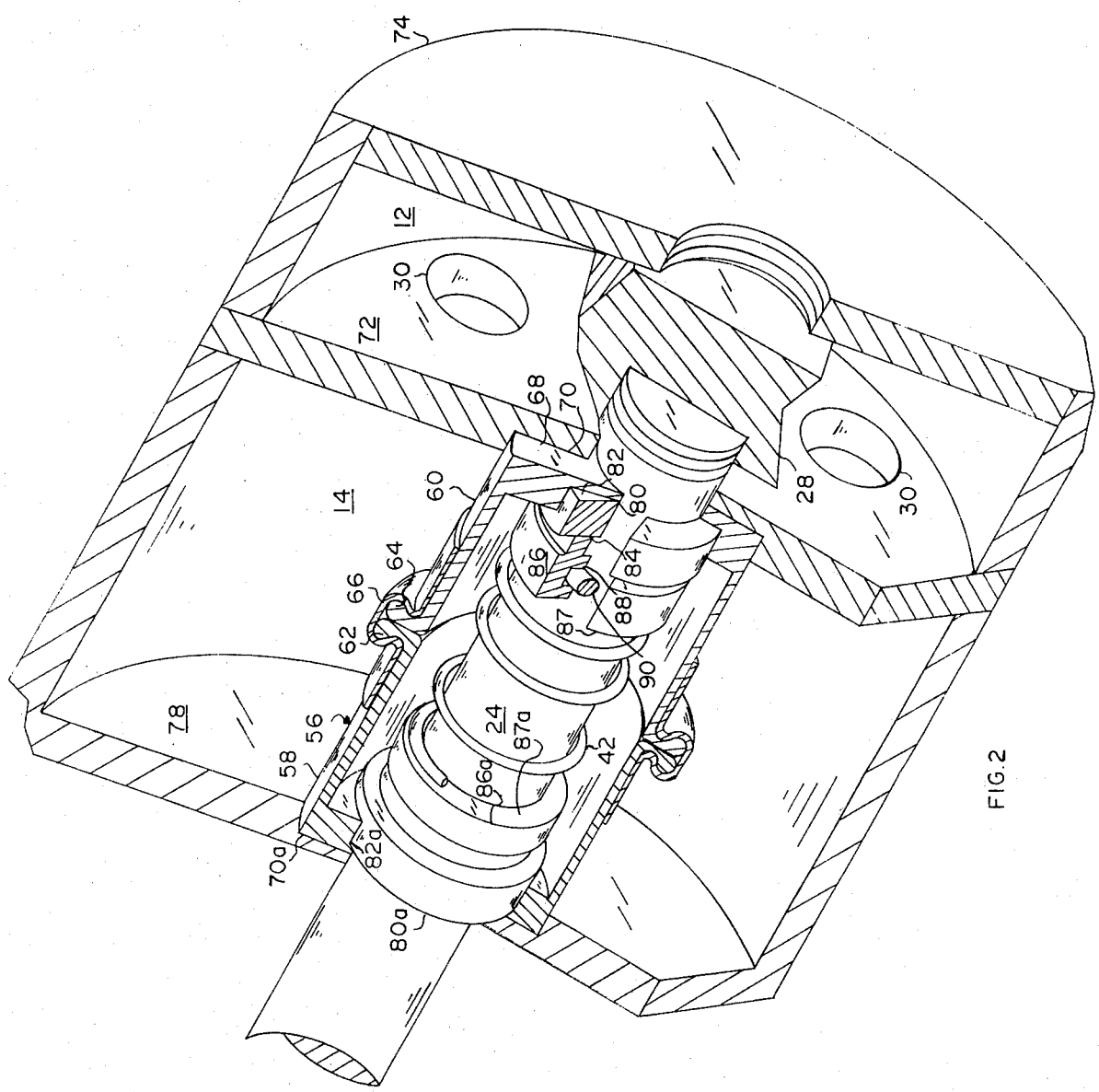
FIG. 2 is a pictorial view, partially in section and partially cut away, of an alternate embodiment of the invention.

The embodiment of the invention shown in FIG. 2 is identical with that shown in FIG. 1 as to the seal structure and spring, and identical components carry the same reference numerals as FIG. 1. It differs in that the diaphragm shown in FIG. 1 is replaced by a cylindrical diaphragm or bladder 56. Bladder 56 is formed of two cup-like half bladder members 58 and 60 which are positioned open end-to-open end and have on adjoining open ends turned-up lips 62 and 64. The two bladder members are then sealed together by annular-shaped retaining clip 66 which fits around and compresses together lips 62 and 64. An opposite end 68 of bladder member 60 is generally L-shaped in cross section and fits within mating recess 70 in wall 72 of pump housing 74. Similarly, the opposite end 76 of bladder member 58 is identical and fits within outer wall 78 of housing 74. A rectangular, in cross section, annular seal 80 fits within recess 82 formed in end 68 of bladder 56 to provide a stationary sealing surface against which rotating seal member 86 is engaged. Rotating seal 86 has an annular rectangular cavity 88 in which is positioned O ring 90 which provides longitudinal support and locates seal member 86 of shaft 24. The left end seal configuration is identical, and components identical to those on the right carry the same reference numerals, but with the suffix "a." Thus, rectangular seal 80a is positioned in recess 82a of bladder member 58 and rotating seal 86a positioned on shaft 24 by an O ring (not shown, but identical to O ring 90). Spring 42 applies a compressive force between rotating seals 86 and 86a to thus urge each of these seals frictionally against its adjoining stationary seal, seal 80 or 80a. Cavity 92, created by bladder 56, is filled with a lubricating fluid.

In operation, pressure created in impeller chamber 12 is applied through openings 30 to chamber 14 where pressure is applied against bladder 56, and it applies pressure against the fluid within the bladder. In turn, a like pressure is applied to sides 87 and 87a of rotating seals 86 and 86a which, as in the case of the embodiment shown in FIG. 1, provides the supplemental biasing force which adds to that provided by spring 42 to provide a total biasing force to the sealing members.

As in the case of the other embodiment, and by virtue of the reduction of biasing force when there is little or no fluid pressure in pump chamber 12, a frictional force between relatively rotating sealing members is significantly reduced and thereby their life materially extended.

FIG. 3 shows still another embodiment of the invention, one having an extremely narrow total cross section, thus enabling a significantly smaller structure. Basically, the narrow cross section is achieved by the use of pancake spring 94 (FIGS. 4 and 5) instead of a coil spring. Spring 84 is formed of thin resilient material and includes a circular ring 96 and integral inwardly projecting tabs 98. The ends 100 of tabs 98 form a circle 102 closely spaced to pump drive shaft 24 with the plane of the circle normal of shaft 24. A first set of alternately positioned tabs, commencing with tab 104, project away from the plane in one direction, and a second set of alternately positioned tabs, commencing with tab 106, projects oppositely away from the plane. By this configuration, and as shown in FIG. 3, the first set of tabs is positioned by and provides a biasing force through washer 108 and O ring 110 to L-shaped bearing seal 112, all of which rotate with shaft 24. Seal 112, rotating, is thus biased against stationary seal 114, the latter being L-shaped and held in L-shaped seal ring 116, in turn supported by a radial inner edge of wall 118. Similarly, identical components carrying identical reference numerals, but with the suffix "a," provide through the second set of tabs a biasing force through washer 108a and O ring 110a to L-shaped bearing seal 112a, all of which thus rotate. Seal 112a, rotating, is thus biased against stationary seal member 114a, which in turn is biased against seal support ring 116a supported by seal chamber wall 119.

Spring member 94 functions to provide a basic and minimum bias which will effect sealing between seal surfaces of zero or low pump fluid pressures present. The major seal biasing force is provided by a fluid bias derived from impeller chamber 12. As shown, rigid wall 118 between chambers 12 and 14 has an annular distended region 122 across which is positioned diaphragm 120. Wall 118 is attached to and supported by a cylindrical portion of housing 124 and sealed by O ring 125 which is sealably held between wall 118 and housing 124. Wall 118 has crimped inner and outer edges which compress and hold flexible diaphragm 120. Alternately, diaphragm 120 may be held by other comparable means. In this version of the invention, diaphragm 120 is positioned on the impeller chamber side of the assembly, and openings 126 in wall 118 permit lubricating fluid introduced into seal chamber 14 to fill through the openings into a cavity region 128 between diaphragm 120 and wall 118. Thus, fluid pressure in impeller chamber 12 is communicated by diaphragm 120 through cavity 128 and into seal chamber 14 where it provides an axial direction biasing force on washers 108 and 108a, which in turn apply force on adjoining rotating seals, seal 112 or 112a. In this fashion, a supplemental biasing force urges each of the rotating seals against an adjoining stationary seal and functions as previously described with respect to the embodiments of the invention illustrated in FIGS. 1 and 2.

Diaphragm 120 may either be planar as shown in FIG. 3 or, as shown in FIGS. 6 and 7, may be in the form of a corrugated member 134 which may be either of a fabric or of a metal. In either case, its function is to communicate fluid pressure between impeller chamber 12 and seal chamber 14.

Figure 8:
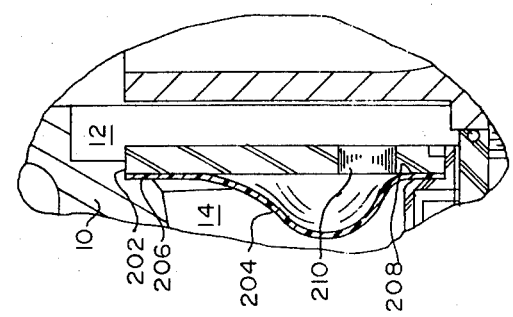
FIG. 8 is a partial sectional view of an alternate form of diaphragm construction.

Still another arrangement of the diaphragm structure is shown in FIG. 8. In this version of the invention, a rigid wall 202 separates chambers 12 and 14. Diaphragm 204, of yielding material, e.g., as typically formed by bonding layers of ethylenepropylene and neopreme materials, is positioned in seal chamber 14. Outer and inner edge regions 206 and 208 of diaphragm 204 are clamped between housing 10 and wall 202, which is held in place by screws (not shown). Six equally spaced holes 210 formed in wall 202 permit fluid pressure in impeller chamber 12 to be transferred into seal chamber 14 when diaphragm 204 is deflected as shown in FIG. 8.

Figure 9:
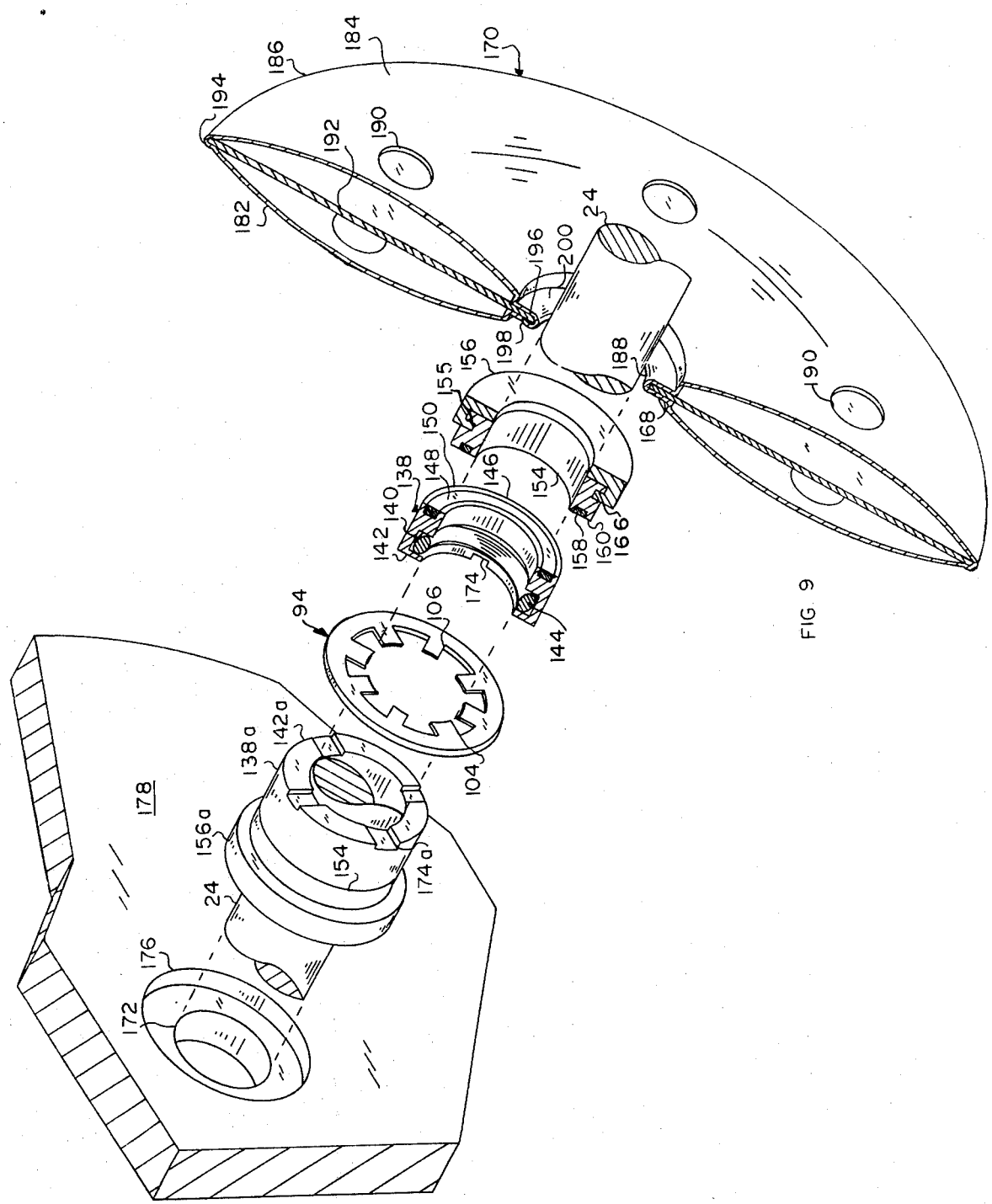
FIG. 9 is an exploded view of an alternate form of a diaphragm and sealing members for the embodiment of the invention shown in FIG. 3.

The embodiment of the invention shown in FIG. 9 differs from the one shown in FIG. 3 in that alternate forms of seal structure and wall-diaphragm structure are illustrated. Where identical components are retained, they carry identical numbers to their counterparts in FIG. 3.

Annular seal 138, which is the rotating seal, is generally constructed of a conventional seal material and has a generally rectangular cross section. It includes an inner recess 140 near one end of face 142 in which O ring 144 is positioned to generally position seal 138 on shaft 24. The active seal surface 146 of the seal is provided by annular ring 148 of a hard, wear-resistant material, such as carbide, which is embedded in end region 150 of seal 138, or which carbide material forms seal 138.

Stationary seal 154 is positioned around but spaced from shaft 24. It is generally rectangular in cross section, but includes an outer annular notch 155 by which it is held by seal support 156. Annular ring 158, positioned in end region 160 of stationary seal 54, is of a like or similar construction to that of annular ring 148, with which it provides a frictional seal. Seal support 156 is generally L-shaped, engaging notch 155 of seal 154 by edge 166 turned radially inward. Its outer L-shaped form is pressed into a mating L-shaped recess 168 of wall-diaphragm unit 170 and secures stationary seal 154 from rotation. To the left of spring 94 are components for sealing shaft opening 172 and are identical to those to the right, and they bear like reference numerals, but with the suffix "a."

Tabs 106 of spring 94 provide a spring bias to the right on seal 138. Tabs 104 provide a bias to the left on seal 138a. Engagement with the seals is facilitated by circumferentially spaced notches 174 and 174a in seals 138 and 138a, respectively.

L-shaped seal support 156a is positioned in recess 176 of wall 178 and around shaft opening 172.

Wall-diaphragm 170 would replace the combination of wall 118 and diaphragm 120 shown in FIG. 3. The wall portion is formed of identical sides 182 and 184 which flare oppositely and symmetrically between outer and inner circular edge regions 186 and 188, each including openings 190. Outer edge region 186 is secured to a periphery of a pump housing as illustrated for wall 118 of FIG. 3. Annular-shaped diaphragm 192 extends between and is secured in crimped spaces 194 and 196 of outer and inner circular edge regions 186 and 188, respectively. The inner edge region of wall side 182 is crimped to form recess 198 which secures and seals seal support 156 to wall side 182. Additionally, the inner edge region of wall side 184 is crimped to form an identical recess 200 to that of recess 198, and thus the configuration of wall-diaphragm unit 170 insures that the unit cannot be installed backwards. This configuration, wherein the diaphragm is largely shielded by wall side 184, reduces abrasive action on diaphragm 192 from material being pumped.

In operation, hydraulic forces transmitted through openings 190 and via diaphragm 192 to seal chamber 14 provide supplemental biasing on end faces 142 and 142a of seals 138 and 138a with the same effect as previously described.

In summary, by providing as needed supplemental hydraulic biasing of the seals, static biasing by spring tension may be reduced by a factor of 10 to 1, which together with lubrication provided by the seal chambers, results in a dramatic decrease in incidences of seal failures.

Having thus described my invention, what is claimed is:

1. A rotary pump assembly comprising:
    a generally circular pump enclosure;
    a generally cylindrical seal enclosure of reduced diameter to said pump enclosure and having an outer cylindrical wall comprising at least in part a diaphragm and adapted to contain therein a lubricating fluid, said enclosures sharing a common wall, and said seal enclosure having a wall opposite to that of said common wall;
    a rotary pump positioned within said pump enclosure and having a driven shaft which passes through said walls;
    first and second stationary shaft sealing members positioned around said shaft in opposite walls of said seal enclosure, and said sealing members having facing planar seal surfaces;
    first and second spaced rotating seal members around and rotating with said shaft, said first rotating seal member having a planar surface positioned adjacent to and adapted to frictionally engage said first stationary seal member, and said second rotating seal member having a planar surface adjacent to and adapted to frictionally engage with the planar surface of said second stationary seal member;
    spring bias means for applying a bias to said rotating sealing members for biasing said rotating sealing members against said stationary sealing members; and
    a fluid chamber connected to said pump enclosure and extending around said diaphragm, whereby fluid being pumped through said pump enclosure would be in direct communication with an exterior side of said diaphragm and effect a pump pressure thereon.

2. A rotary pump assembly as set forth in claim 1 wherein said diaphragm is a cylindrical diaphragm within said second enclosure and extends around said sealing members and said spring biasing means and sealably extends between said walls, whereby said fluid pressure from said first enclosure is coupled through said diaphragm to said rotary sealing member.

3. A rotary pump assembly as set forth in claim 1 wherein said spring bias means comprises a coil spring.

* * * * *